Aug. 17, 1937. R. C. OSTERSTROM 2,090,333
METHOD OF MAKING LUBRICATING OIL
Filed June 27, 1935
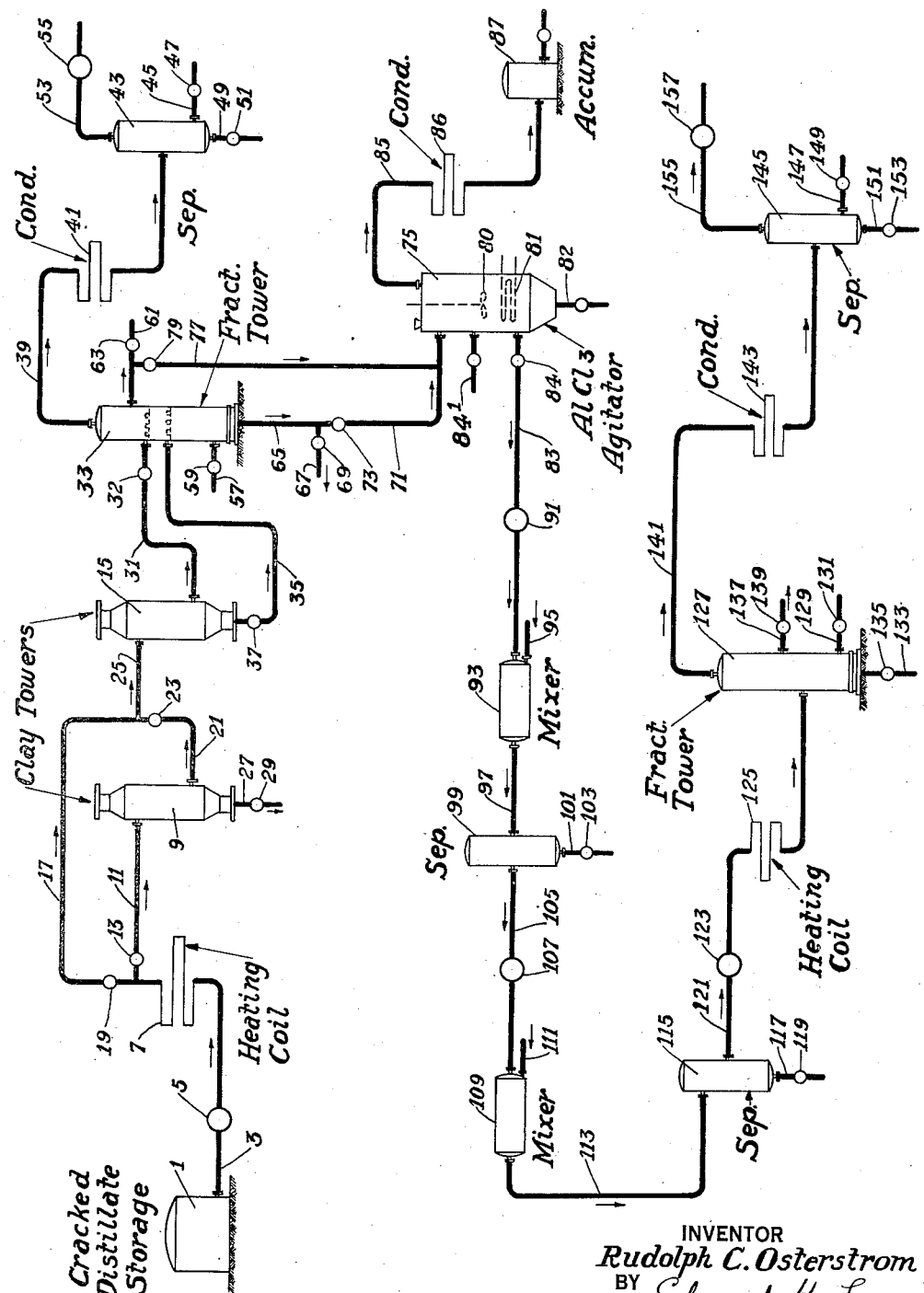
INVENTOR
Rudolph C. Osterstrom
BY Edward H. Lang
ATTORNEY Patented Aug. 17, 1937

2,090,333

UNITED STATES PATENT OFFICE 2,090,333

METHOD OF MAKING LUBRICATING OIL

Rudolph C. Osterstrom, Kenilworth, Ill., assignor to The Pure Oil Company, Chicago, Ill., a corporation of Ohio Application June 27, 1935, Serial No. 28,672

8 Claims. (Cl. 196—78)

This invention relates to improved hydrocarbon lubricating oil and to the process for producing the same, an outstanding object of the invention residing in the production of a wax-free viscous hydrocarbon oil which is suitable for a lubricant or which may be blended with other lubricating oils for the purpose of depressing the pour point of such latter oils.

Motor fuel distillates produced by the cracking of hydrocarbon oils or by the cracking or polymerization of hydrocarbon gases generally contain unstable, unsaturated hydrocarbons which have a tendency to form colored bodies or gums when the distillate is allowed to remain in storage. The amount and activity of the gum-forming and color-imparting constituents present in the distillate depends largely upon the method employed in preparing the distillate. So-called liquid phase cracked distillates contain a relatively small amount of gum-forming or color-imparting bodies, whereas vapor phase cracked distillates generally contain a large amount of these constituents, necessitating their removal before the distillate is fit for use as a motor fuel.

Motor fuel prepared by cracking hydrocarbon oils in the vapor phase at pressures approximately atmospheric or slightly above and at temperatures of approximately 1000° to 1200° F. are highly unstable and must be refined to eliminate the gum-forming and color-imparting bodies. Although my invention relates to the method of treating distillates made by any process resulting in a distillate from which the gum-forming and/or color-imparting bodies must be removed, it is particularly adapted to the treatment of vapor phase cracked distillates. A two-fold purpose is served: a refined motor fuel is prepared and the products which are eliminated therefrom and considered unfit as motor fuel constituents are converted into lubricants which are highly useful per se and in a mixture with other lubricants.

In carrying out my invention, a cracked or other distillate containing gum-forming and/or color-imparting bodies is subjected to selective polymerization in order to polymerize the gum-forming or color-imparting bodies without materially attacking those unsaturates which are desirable as constituents of the motor fuel. The resulting polymers, being of higher boiling points than the gasoline, may be separated therefrom by fractionation and then mixed with aluminum chloride or anhydrous aluminum chloride and subjected to heat treatment for a period of time sufficient to reduce its iodine number to a minimum. After the treatment with aluminum chloride is completed, the sludge is separated by decantation or otherwise from the resulting oil and the oil water washed and neutralized. It may then be subjected to fractional distillation in order to prepare lubricating oils of any desired viscosity.

Motor fuel distillate, preferably prepared by vapor phase cracking, may be treated in any manner suitable for selectively polymerizing the gum-forming and color-imparting constituents. Although the use of heat and pressure, dilute sulfuric acid or regulated quantities of metallic halides may be used for this purpose, my preferred method is to subject the distillate either in the liquid or vapor phase at elevated temperatures and in some cases at elevated pressures, to treatment with an adsorptive polymerizing catalyst such as fuller's earth or similar clay. When treating with adsorptive catalyst in the vapor phase, the distillate may be vaporized and contacted with the catalyst at a temperature of from 150° to 650° F. and at pressures ranging from atmospheric to 300 or more pounds per square inch. When treating in the liquid phase, the gasoline may be contacted with the catalyst preferably in a stationary bed under pressures of from 500 to 1500 pounds per square inch and at temperatures ranging from 300° to 600° F. It will be obvious that the conditions of temperature and pressure may be varied so that the distillate when contacted with the catalyst may be partially in the vapor and partially in the liquid phase. In any case the temperature to which the distillate is heated should be below the temperature at which cracking takes place. At the temperatures and pressures above recited, the unstable gum-forming and color-imparting constituents in the distillate are converted to heavy polymers which will not vaporize at the temperature of the distillate and are easily separated therefrom by fractionation.

After separation of the motor fuel distillate from the polymers, the polymers may or may not be further reduced by steam and/or vacuum to remove light ends and then admixed with a quantity of anhydrous aluminum chloride ranging from .2 to .5% by weight at a temperature not in excess of 400° F. in order to avoid decomposition as much as possible. Other halides such as tin chloride, iron chloride, or zinc chloride, may be used in place of or admixed with the aluminum chloride. The quantity of halide added to the polymers will depend primarily on the nature of the polymers. The polymers may have a high degree of unsaturation ranging from approximately 80 to 300 iodine number as determined by the Wijs method, depending largely upon the nature of the distillate treated and the method employed in preparing the polymers. For example, vapor phase cracked distillate will produce polymers of higher unsaturation than polymers of liquid phase cracked distillate produced by the same method of polymerization. Moreover, treatment of the cracked distillate in the vapor phase at low pressures with adsorptive catalyst will result in a polymer of higher unsaturation than can be produced by treatment in the liquid phase at elevated pressures. In practice, when utilizing the vapor phase method of refining gasoline, two or more catalyst chambers are used in order to subject the vapors to successive treatments. The polymers resulting from the passage of the vapors through the first clay chamber will generally have a much higher iodine value than those resulting from the second chamber. This is probably accounted for by the fact that the most reactive constituents are polymerized in the first chamber.

For the purpose of my invention, the polymers of lower iodine value are more suitable than the more unsaturated polymers since the highly unsaturated polymers are useful per se as drying oils and have a high economic value, whereas the polymers of lower unsaturation are not suitable as drying oils because of the long period required in drying and because they are unsuitable as lubricating oils on account of their instability and the readiness with which they oxidize to form gums under operating conditions. Moreover, the polymers of lower unsaturation are easier to convert into a stable lubricating oil.

Polymers which have been found suitable to my invention are those formed by treatment of vapor phase cracked motor fuel distillate with fuller's earth or similar clay, in a two-step operation. Polymers formed in the second clay chamber, after reduction by fire and steam, may have an A. P. I. gravity of 10.7, a viscosity (Say.) at 210° F. of 190, and an iodine value of 130 to 140. Polymers prepared by treating vapor phase cracked distillate with fuller's earth or similar clay at elevated pressures of about 1000 pounds per square inch and at temperatures of approximately 600° F., are also useful for my process. These polymers may have approximately the same iodine value as those recovered from the second tower of a vapor phase clay treatment carried out at substantially atmospheric pressure. The polymers may or may not be fractionated prior to the treatment with aluminum chloride. It has been found that different fractions of the polymers have different iodine numbers and therefore it may be desirable to separate fractions of higher iodine value from the fractions of lower iodine value prior to treatment with halide catalyst. For example, the polymers produced by treatment of vapor phase cracked distillate with adsorptive clay at pressures of approximately 1000 pounds per square inch and at approximately 600° F. when reduced to 18 A. P. I. gravity representing 45% of the total polymers, yielded a product having an iodine value of 150, whereas the total polymers had an iodine value between 80 and 90. Generally speaking, the lighter fractions of the polymers have lower iodine numbers than the heavier fractions. Thus it may be advisable to separate the polymers into fractions of lower and higher iodine numbers prior to treatment with halide or other saturating agent since some fractions may require more stringent treatment than others due to their higher unsaturation. Moreover, certain fractions, because of their high iodine number, may be segregated for use as drying oils. Care must be exercised in reducing the polymers since excessive heating has a tendency to decompose the polymers with formation of carbon. After treatment with aluminum chloride is completed, it may be desirable to reblend all or part of the fractions to meet viscosity specifications.

During the agitation with aluminum chloride or other halide catalyst, any light vapors which are evolved are allowed to pass overhead and are condensed. Samples of the polymers undergoing treatment may be taken from time to time and the iodine value determined. When a point is reached where the iodine value no longer decreases, the treatment is complete and agitation may be stopped. The resulting oil may then be decanted or otherwise separated from the aluminum chloride sludge and cooled to substantially atmospheric temperature. The oil is water washed and neutralized with dilute alkaline solution in order to remove any remaining traces of aluminum chloride, hydrochloric acid or other corrosive ingredients that may be present in the oil. The oil may then be subjected to a final distillation in the presence of steam and/or vacuum to form an overhead stock of desired viscosity and residual oil which is suitable as cylinder oil. The aluminum chloride contained in the sludge may be partially or substantially completely exhausted. If not completely exhausted, it may be used for a succeeding treatment. If entirely exhausted, it may be reactivated by known processes.

The drawing is a diagrammatic elevational view of apparatus suitable for carrying out the process.

Referring to the drawing, the numeral 1 indicates a tank for storing cracked distillate. The distillate is withdrawn from tank 1 through line 3 by means of pump 5 and charged through heating coil 7 wherein it is heated to a temperature suitable for clay treatment. From the heating coil 7 the distillate may pass into clay tower 9 through line 11 controlled by valve 13, or it may pass into clay tower 15 through line 17 controlled by valve 19. If liquid phase clay treatment is used, it may be desirable to use only a single clay tower, whereas if vapor phase clay treatment is used, both towers will preferably be employed.

If the distillate is charged through clay tower 9 the vapors issue therefrom through line 21 controlled by valve 23 and pass through line 25 into the second clay tower 15. The heavy polymers formed in clay tower 9 are withdrawn therefrom through line 27 controlled by valve 29.

If the cracked distillate is charged under high pressure to the clay towers in order to retain it in the liquid phase, the liquid is withdrawn from clay tower 15 through line 31 controlled by valve 32 and charged into an intermediate portion of fractionating tower 33. If vapor phase clay treatment is employed, the vapors are withdrawn from clay tower 15 through line 31 and the polymers are withdrawn therefrom through line 35 controlled by valve 37 and charged to an intermediate portion of the fractionating tower 33.

Finished motor fuel is withdrawn from the top of fractionating tower 33 through line 39 and condenser 41 into separator 43. Finished motor fuel may be withdrawn from separator 43 through line 45 controlled by valve 47, and any water which may collect therein is withdrawn through line 49 controlled by valve 51. The top of the separator 43 may be connected by a line 53 to a vacuum pump 55.

Fractionation may be assisted by injecting open steam into fractionating tower 33 through line 57 controlled by valve 59. An intermediate polymer fraction may be withdrawn as a side stream from the fractionating tower through line 61 controlled by valve 63. The polymer bottoms may be withdrawn from the fractionating tower through the line 65 and may either be withdrawn from the system through line 67 controlled by valve 69, or may, in whole or part, be charged through line 71 controlled by valve 73 into the aluminum chloride agitator 75. The light polymer fraction may likewise, in whole or part, be charged through line 77 controlled by valve 79 to the aluminum chloride agitator 75.

The aluminum chloride agitator is equipped with an agitating blade 80 and a heating coil 81. Aluminum chloride sludge may be withdrawn therefrom through the valve-controlled withdrawal pipe 82 and the oil may be decanted through line 83 controlled by valve 84. Samples may be withdrawn from agitator 75 through valve-controlled pipe 84'. Any vapors formed are withdrawn through line 85 and condenser 86, and collected in accumulator 87.

From the aluminum chloride agitator the decanted oil is charged by means of pump 91 into the mixer 93 where it is washed with water introduced through line 95. From the mixer the oil and water passes through line 97 into separator 99 from which the aqueous solution is withdrawn through line 101 controlled by valve 103 and the oil is withdrawn through line 105. The oil is next charged by means of pump 107 into mixer 109 wherein the oil is washed with caustic soda solution introduced through line 111. The caustic soda-oil mixture passes through line 113 into separator 115 from which the caustic solution is withdrawn through line 117 controlled by valve 119 and the oil is withdrawn through line 121. From line 121 the oil is pumped by means of pump 123 through heating coil 125 into the intermediate portion of fractionating tower 127 wherein the oil is separated into desired lubricating oil fractions. Steam to aid in fractionation may be introduced into the fractionating tower 127 near the bottom through line 129 controlled by valve 131. The heaviest fraction of the lubricating oil may be withdrawn from the tower through line 133 controlled by valve 135. An intermediate fraction may be withdrawn through line 137 controlled by valve 139. A light overhead fraction may be withdrawn through line 141, condenser 143 into separator 145. The condensed fraction may be withdrawn from the separator through line 147 controlled by valve 149 and any condensed water may be withdrawn from the separator through line 151 controlled by valve 153. The top of the separator may be connected by means of line 155 to a vacuum pump 157.

In addition to being useful per se as lubricants, the oil prepared in accordance with my process may, either before or after fractionation into desirable cuts, be blended in desired proportions, preferably 1 to 50%, with other lubricating oils, as for example, neutrals, which have been partially dewaxed. The pour test of such partially dewaxed oil may be considerably depressed by addition thereto of oils prepared in accordance with my invention, and such blended oils will compare favorably in pour test with oils which have been dewaxed by solvent extraction or by low temperature refrigerating and centrifuging.

Although I have disclosed my invention as involving a step of selective polymerization particularly with adsorptive catalyst such as fuller's earth, it is to be understood that other polymerizing catalysts may be used, which have a selective action, or the selective polymerization may be accomplished by means of controlled heat and pressure treatment without the use of catalysts. Moreover, in place of heat treatment with halide catalysts, other methods may be used to saturate the polymers, such as treatment with hydrogen at high super-atmospheric pressures of the order of 2000 or more pounds per square inch and at elevated temperatures below those at which substantial decomposition takes place, preferably between 700° and 800° F., either in the presence or absence of catalysts.

It will be seen therefore that in its broadest aspects my invention embraces the method of preparing lubricants by selectively polymerizing the gum-forming and/or color-imparting bodies in cracked distillates and thereafter subjecting these polymers to treatment suitable for saturating the polymers.

This application is a continuation-in-part of my application Serial No. 575,871, filed November 18, 1931.

What I claim is:

1. The process of producing a hydrocarbon lubricating oil from polymers obtained by polymerizing substantially only the gum-forming and color-imparting compound in low boiling hydrocarbons produced by vapor phase cracking of higher boiling petroleum oils solely with an adsorptive catalyst which selectively polymerizes gum-forming and color-imparting bodies, which comprises treating said polymers with a metallic halide catalyst at elevated temperatures below cracking temperatures, and distilling an overhead fraction as lubricating oil.

2. Process in accordance with claim 1 in which the halide catalyst is aluminum chloride.

3. The method of producing hydrocarbon lubricating oil which comprises subjecting low boiling hydrocarbons produced by vapor phase cracking of higher boiling petroleum oils to contact solely with an adsorptive polymerizing catalyst at elevated temperatures below cracking temperature whereby to selectively polymerize gum-forming and color-imparting constituents, separating said polymerized constituents from the main portion of the unpolymerized constituents, treating the separated polymers with a metallic halide catalyst at elevated temperatures below cracking, and distilling the treated polymers in order to obtain a lubricating oil fraction as a distillate.

4. The method of producing hydrocarbon lubricating oil which comprises subjecting low boiling hydrocarbons produced by vapor phase cracking of higher boiling petroleum oils to contact solely with an adsorptive polymerizing catalyst at elevated temperatures below cracking temperature whereby to selectively polymerize gum-forming and color-imparting constituents, separating said polymerized constituents from the main portion of the unpolymerized constituents, treating the separated polymers with aluminum chloride, at elevated temperatures below cracking, and distilling the treated polymers in order to obtain a lubricating oil fraction as a distillate.

5. The method of producing valuable lubricating oils which comprises subjecting low boiling hydrocarbons produced by cracking of petroleum oils to contact solely with solid adsorptive polymerizing catalyst at temperatures in excess of their normal vaporizing temperature but below cracking temperature and at pressures sufficiently high to maintain a substantial portion of said hydrocarbons in the liquid phase whereby to selectively polymerize the gum-forming and color-imparting constituents, separating the resulting polymers from the unpolymerized lower boiling hydrocarbons, and treating said polymers with a metallic halide catalyst at elevated temperatures but below temperatures at which a substantial amount of cracking takes place.

6. Method in accordance with claim 5 in which the pressure ranges from 300 to 1500 pounds per square inch.

7. The method of producing valuable lubricating oils which comprises cracking petroleum oil, contacting the cracked light vapors with at least two successive bodies of solid adsorptive polymerizing catalyst in the absence of other catalysts under conditions to selectively polymerize the gum-forming and color-imparting bodies contained in said vapors, separately collecting the resulting polymers from the second catalyst body and subjecting said polymers to treatment with metallic halide catalyst at elevated temperatures not substantially in excess of 400° F.

8. The method of producing lubricating oil which comprises subjecting low boiling liquid hydrocarbons produced by cracking of petroleum oils to contact solely with solid adsorptive polymerizing catalyst at temperatures in excess of their normal vaporizing temperature but below cracking temperature in order to selectively polymerize the gum-forming and color-imparting constituents contained therein, separating the resulting polymers from the unpolymerized lower boiling hydrocarbons, fractionating the polymers to separate therefrom a light fraction having a relatively low iodine value, treating the last-mentioned fraction with a metallic halide catalyst at elevated temperatures but below temperatures at which a substantial amount of cracking occurs, and separating the resulting oil from the metallic halide sludge.

RUDOLPH C. OSTERSTROM.